United States Patent
Lu

(10) Patent No.: US 11,894,974 B2
(45) Date of Patent: Feb. 6, 2024

(54) NETWORK SWITCHING METHOD, NETWORK NODE, CHIP AND COMMUNICATION SYSTEM

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 470 days.

(21) Appl. No.: 17/159,627

(22) Filed: Jan. 27, 2021

(65) Prior Publication Data
US 2021/0152419 A1    May 20, 2021

Related U.S. Application Data

(63) Continuation of application No. PCT/CN2018/099220, filed on Aug. 7, 2018.

(51) Int. Cl.
*H04L 41/0803* (2022.01)

(52) U.S. Cl.
CPC .................. *H04L 41/0803* (2013.01)

(58) Field of Classification Search
None
See application file for complete search history.

(56) References Cited

U.S. PATENT DOCUMENTS

| 2015/0009915 A1* | 1/2015 | Baek .................. H04W 76/14 370/329 |
| 2016/0262066 A1 | 9/2016 | Ozturk et al. |
| 2018/0199315 A1 | 7/2018 | Hong et al. |

(Continued)

FOREIGN PATENT DOCUMENTS

| CN | 104469869 A | 3/2015 |
| CN | 104640165 A | 5/2015 |

(Continued)

OTHER PUBLICATIONS

Chinese First Office Action with English Translation for CN Application 201880096151.8 dated Nov. 15, 2022. (12 pages).

(Continued)

*Primary Examiner* — Brian S Roberts
(74) *Attorney, Agent, or Firm* — Young Basile Hanlon & MacFarlane, P.C.

(57) ABSTRACT

Provided are a network switching method, a network node, a chip and a communication system, the method comprising: a first node acquires indication information, the indication information being used to indicate to the first node to switch a receiving path and/or a transmitting path of a data packet of the first node; and the first node receives and/or transmits the data packet according to the indication information. In the implementations of the present disclosure, the first node directly switches the receiving path and/or the transmitting path of the data packet thereof by means of the indication information, which avoids a reconstruction operation of a PDCP entity of the first node during the switching process of the first node, thereby avoiding an interruption in the service of the PDCP entity, and improving the data transmission efficiency.

19 Claims, 5 Drawing Sheets

(56) References Cited

U.S. PATENT DOCUMENTS

2019/0053325 A1* 2/2019 Yu .................... H04W 76/15
2019/0281511 A1* 9/2019 Susitaival ....... H04W 36/00835
2020/0205034 A1* 6/2020 Tang .................... H04W 76/22

FOREIGN PATENT DOCUMENTS

| CN | 107409336 A | 11/2017 |
|---|---|---|
| CN | 108282823 A | 7/2018 |
| CN | 108282825 A | 7/2018 |
| CN | 108282832 A | 7/2018 |
| EP | 3687239 A1 | 7/2020 |
| WO | 2015171053 A1 | 11/2015 |
| WO | 2018026401 A1 | 2/2018 |

OTHER PUBLICATIONS

International Search Report with English Translation for PCT/CN2018/099220 dated Apr. 22, 2019.
Chinese Notification to Grant Patent Right for Invention with English Translation for CN Application 2018800961518, dated Jun. 14, 2023. (7 pages).
Chinese Second Office Action with English Translation for CN Application 2018800961518 dated Mar. 24, 2023. (14 pages).
Communication pursuant to Article 94(3) Epc for Ep Application 18929348.3 dated Dec. 15, 2021. (5 pages).
Extended European Search Report for EP Application 18929348.3 dated Jul. 2, 2021. (11 pages).
Adnan Aijaz, Packet Duplication in Dual Connectivity Enabled 5G Wireless Networks: Overview and Challenges, IEEE Communications Standards Magazine, 9 pages.

* cited by examiner

NETWORK SWITCHING METHOD, NETWORK NODE, CHIP AND COMMUNICATION SYSTEM

CROSS-REFERENCE TO RELATED APPLICATION(S)

The present application is a continuation application of International PCT Application No. PCT/CN2018/099220, filed on Aug. 7, 2018, the entire content of which is hereby incorporated by reference.

TECHNICAL FIELD

Implementations of the present disclosure relate to a field of communication, and more particularly, to a network switching method, a network node, a chip and a communication system.

BACKGROUND

Currently, in a discussion of NR, data duplication transmission based on PDCP duplication has been carried out to improve reliability of the data transmission. Two protocol architectures are currently defined in NR to support the data duplication transmission. They are data duplication transmission of a carrier aggregation (CA) and data duplication transmission of a dual connectivity (DC) respectively.

However, in the above two protocol architectures, data duplication transmission is performed based on a unique PDCP entity. Therefore, when a user equipment (UE) moves from a first access network device to a second access network device, a security key needs to be changed. However one PDCP entity can only use one security key at one time. That is to say, in a network switching for the data duplication transmission, the change of the security key causes the UE to reconfigure the security key through an operation of PDCP re-establishment, which may cause an interruption of a service of the PDCP entity.

Therefore, as for the network switching for the data duplication transmission, how to avoid the interruption of the service of the PDCP entity so as to improve an efficiency of data transmission is an urgent problem to be solved in this field.

SUMMARY

There are provided a network switching method, a network node, a chip and a communication system, by which an interruption of a service of a PDCP entity may be avoided so as to improve an efficiency of data transmission.

In a first aspect, there is provided a network switching method, including:

obtaining, by a first node, indication information, wherein the indication information is used for indicating the first node to switch a receiving path and/or a sending path of a data packet of the first node; and receiving and/or sending, by the first node, data packet according to the indication information.

In some possible implementation modes, the indication information is used for indicating the first node to switch from receiving the data packet from a fourth node to receiving the data packet from a second node.

Receiving and/or sending, by the first node, the data packet according to the indication information includes: receiving, by the first node, the data packet from the second node according to the indication information.

In some possible implementation modes, the indication information is used for indicating a last data packet received by the first node from the fourth node.

In some possible implementation modes, the indication information is used for indicating a sequence number of the last data packet received by the first node from the fourth node.

In some possible implementation modes, the indication information is used for indicating a first data packet received by the first node from the second node.

In some possible implementation modes, the indication information is used for indicating a sequence number of the first data packet received by the first node from the second node.

In some possible implementation modes, the indication information is used for indicating the first node to switch from sending the data packet to a fifth node to sending the data packet to a third node.

Receiving and/or sending, by the first node, the data packet according to the indication information includes: sending, by the first node, the data packet to the third node according to the indication information.

In some possible implementation modes, the indication information is used for indicating a last data packet sent by the first node to the fifth node.

In some possible implementation modes, the indication information is used for indicating a sequence number of the last data packet sent by the first node to the fifth node.

In some possible implementation modes, the indication information is used for indicating a first data packet sent by the first node to the third node.

In some possible implementation modes, the indication information is used for indicating a sequence number of the first data packet sent by the first node to the third node.

In some possible implementation modes, the indication information is also used for indicating a corresponding relationship between a first sequence number and a second sequence number, wherein the first sequence number includes a sequence number of a data packet of an interface between the first node and the second node, and the second sequence number includes a sequence number of a data packet of an interface between the first node and the third node.

In some possible implementation modes, the second node is a node after the first node switches the receiving path.

In some possible implementation modes, the third node is a node after the first node switches the sending path.

In some possible implementation modes, sending, by the first node, the data packet to the third node according to the indication information, includes: generating, by the first node, the data packet, and sending the data packet to the third node according to the indication information.

In some possible implementation modes, the first node or the second node or the third node includes at least one of following:

a terminal device, an access network device, and a core network device.

In some possible implementation modes, an interface of the first node or the second node or the third node includes at least one of following:

a Uu interface, an Xn interface, and an N3 interface.

In a second aspect, there is provided a network node, for implementing the method in the first aspect and any above possible implementation mode of the first aspect.

In some possible implementation modes, the network node includes:

a functional module, configured to execute the method in the first aspect and any above possible implementation mode of the first aspect.

In a third aspect, there is provided a network node, including:

a processor, configured to call and run a computer program from a memory, wherein the computer program is used for executing the method in the first aspect and any above possible implementation mode of the first aspect.

In some possible implementation modes, the network node further includes:

a memory, configured to store a computer program.

In a fourth aspect, there is provided a chip, for executing the method in the first aspect and any above possible implementation mode of the first aspect.

In some possible implementation modes, the method further includes:

A processor for calling and running a computer program from the memory, wherein the computer program is used for executing the method described in the first aspect and any possible implementation modes of the first aspect.

In some possible implementation modes, the chip further includes:

a memory, configured to store a computer program.

In a fifth aspect, there is provided a computer-readable storage medium, for storing a computer program, wherein the computer program is used for executing the method in the first aspect and any above possible implementation mode of the first aspect.

In a sixth aspect, there is provided a computer program product including a computer program, wherein the computer program is used for executing the method in the first aspect and any above possible implementation mode of the first aspect.

In a seventh aspect, there is provided a computer program product, which, when run on a computer, causes the computer to execute the method in the first aspect and any above possible implementation mode of the first aspect.

In an eighth aspect, there is provide a communication system, including a first node, a second node and a fourth node, wherein the first node is configured to, according to indication information, switch to receiving data packets from the second node from receiving data packets from the fourth node.

In a ninth aspect, there is provided a communication system, including a first node, a third node and a fifth node, wherein the first node is configured to, according to indication information, switch to sending data packets to the third node from sending data packets to the third node.

Based on the above technical solution, on one hand, the first node may directly switch from the fourth node to the second node to receive the data packet according to the indication information, that is, directly switching an interface of the node for sending and receiving data, thus a re-establishment operation of the Packet Data Convergence Protocol (PDCP) entity of the first node is avoided when the first node performs a switching of a receiving network, thereby avoiding an interruption of the service of the PDCP entity and improving an efficiency of data transmission. On the other hand, according to the indication information, the first node may directly switch from the fifth node to the third node to receive the data packet, thereby further improving the efficiency of the data transmission.

DETAILED DESCRIPTION

Figure 1:
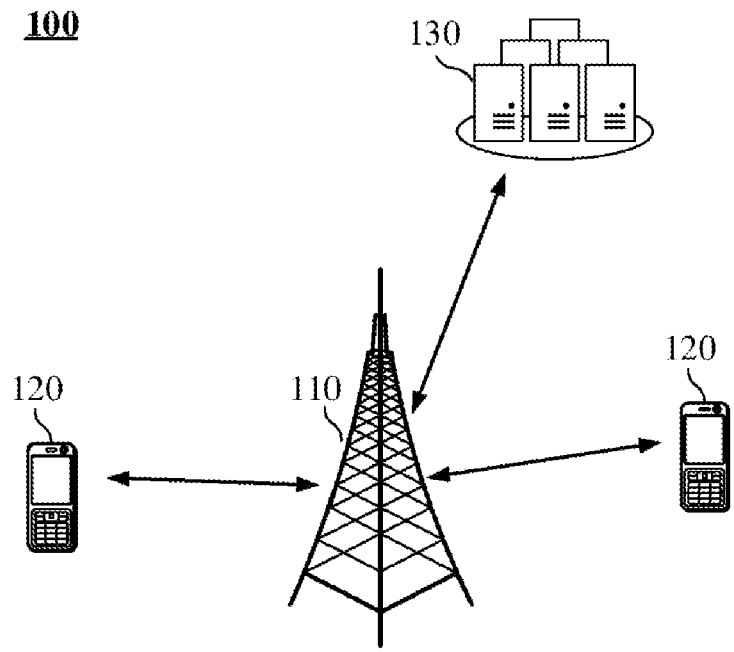
FIG. 1 is a schematic diagram of a wireless communication system of an implementation of the present disclosure.

FIG. 1 shows a wireless communication system 100 to which an implementation of the present disclosure is applied. The wireless communication system 100 may include a base station 110 and at least one terminal device 120 located within a coverage range of the base station 110.

The base station 110 may be a device that communicates with a terminal device. The base station 110 may provide a communication coverage for a specific geographic area and may communicate with a terminal device (e.g., UE) located within the coverage area. Optionally, the base station 110 may be a base station (gNB) in an NR system, or a radio controller in a Cloud Radio Access Network (CRAN). Or the network device may be a relay station, an access point, a vehicle mounted device, a wearable device, or a network device in a future evolved Public Land Mobile Network (PLMN), etc.

The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless network node, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle mounted device, a wearable device, a terminal device in a future 5G network, or a terminal device in a future evolved Public Land Mobile Network (PLMN), etc.

The wireless communication system 100 further includes a core network device 130 that communicates with a base station. The core network device 130 may be a 5G core (5GC) device, for example, an Access and Mobility Management Function (AMF), or an Authentication Server Function (AUSF), or a User Plane Function (UPF), or a Session Management Function (SMF). Optionally, the core network device 130 also may be an Evolved Packet Core (EPC) device of an LTE network, for example, a Session Management Function+Core Packet Gateway (SMF+PGW-C) device. It should be understood that SMF+PGW-C may implement functions which may be implemented by the SMF and the PGW-C at the same time.

Optionally, a connection may be established through a next generation (NG) interface between various functional units in the communication system 100 to implement communication.

For example, the terminal device establishes an air interface connection with the access network device through an NR interface for transmitting user plane data and control plane signaling. The terminal device may establish a control plane signaling connection with the AMF through NG interface 1 (N1 for short). The access network device, such as a next generation radio access base station (gNB), may establish a user plane data connection with a UPF through NG interface 3 (N3 for short). The access network device may establish a control plane signaling connection with the AMF through NG interface 2 (N2 for short). The UPF may establish a control plane signaling connection with the SMF through NG interface 4 (N4 for short). The UPF may exchange user plane data with a data network through NG interface 6 (N6 for short). The AMF may establish a control plane signaling connection with the SMF through NG interface 11 (N11 for short). The SMF may establish a control plane signaling connection with a PCF through NG interface 7 (N7 for short). It should be noted that a part shown in FIG. 1 is only an exemplary architecture diagram. Besides the functional units shown in FIG. 1, the network architecture may also include other functional units or functional entities. For example, the core network device may also include other functional units such as unified data management (UDM), and this is not specifically restricted in implementations of the present disclosure.

FIG. 1 illustratively shows a base station, a core network device and two terminal devices. Optionally, the wireless communication system 100 may include multiple base station devices and other quantity of terminal devices may be included in a coverage range of each base station, and this is not restricted by an implementation of the present disclosure.

In the following, a transmission method for duplicated data in a CA scenario in an implementation of the present disclosure is briefly introduced with reference to FIG. 2.

Figure 2:
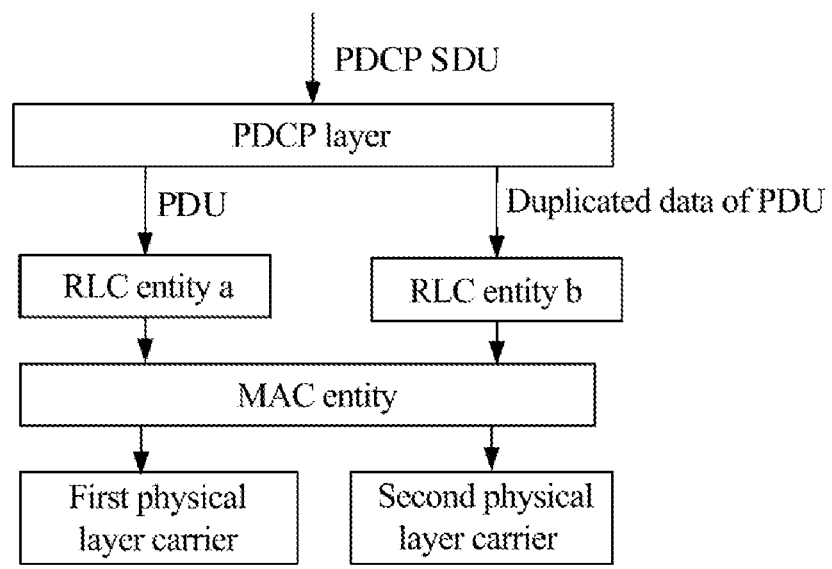
FIG. 2 is a schematic flow chart of a transmission method of duplicated data in a CA scenario of an implementation of the present disclosure.

FIG. 2 is a schematic flow chart of a data transmission method of a PDCP layer of an implementation of the present disclosure.

As shown in FIG. 2, data (a PDU and duplicated data of the PDU) generated by the PDCP layer are transmitted to two different RLC entities (RLC entity a and RLC entity b), and the data are mapped to different physical layer carriers (a first physical layer carrier and a second physical layer carrier) by the two different RLC entities through a same Media Access Control (MAC) layer entity (MAC entity).

It may be understood that in an implementation of the present disclosure, the data (the PDU and the duplicated data of the PDU) generated by the PDCP layer are mapped to different physical layer carriers through two different RLC entities, which may achieve a purpose of frequency diversity gain, and further improve reliability of data transmission.

In practice, each sub-layer may send the data to a designated layer at a receiving end according to the difference of data in a protocol data unit. Data entering each sub-layer and not processed is called a service data unit (SDU), and data in a specific format after processed by the sub-layer is called a Protocol Data Unit (PDU). The SDU is an information unit transmitted from a higher layer protocol to a lower layer protocol. Original data of the SDU is a PDU of an upper layer of protocol. In other words, a PDU formed by the present layer is an SDU of a lower layer.

For example, each logical channel of each terminal device has an RLC entity, and data received by the RLC entity from the PDCP layer or data sent to the PDCP layer may be referred to as an RLC SDU (or a PDCP PDU). Data received by the RLC entity from the MAC layer or data sent to the MAC layer may be referred to as an RLC PDU (or a MAC SDU).

It should also be understood that in an implementation of the present disclosure, an RLC layer is located between the PDCP layer and the MAC layer, and the RLC layer may communicate with the PDCP layer through a Service Access Point (SAP) and communicate with the MAC layer through the logical channel, but implementations of the present disclosure are not limited thereto.

In an implementation of the present disclosure, when data duplication of the PDCP layer is in an active state, PDUs of the PDCP layer (i.e., PDCP PDUs) and duplicated data of the PDCP PDUs are mapped to different physical layer carriers through different RLC entities, which may effectively improve reliability of data transmission.

Figure 3:
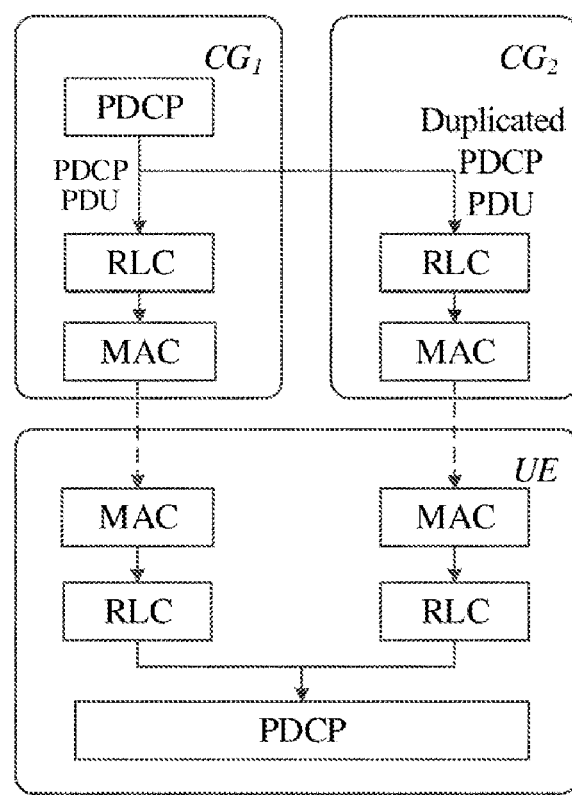
FIG. 3 is an example of a protocol architecture for downlink transmission in a DC scenario of an implementation of the present disclosure.
Figure 4:
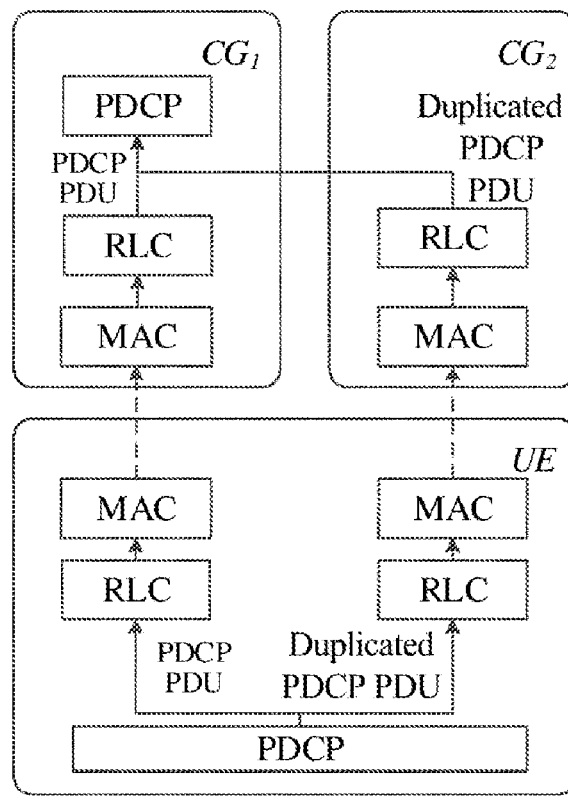
FIG. 4 is an example of a protocol architecture for uplink transmission in a DC scenario of an implementation of the present disclosure.

FIG. 3 is an example of a protocol architecture for downlink transmission in a Dual Connection (DC) scenario of an implementation of the present disclosure, and FIG. 4 is an example of a protocol architecture for uplink transmission in a DC scenario of an implementation of the present disclosure.

It should be understood that in a Dual Connection (DC) scenario, multiple network nodes (cell group (CG)) may serve a terminal device, and transmission of duplicated data may be performed between the cell group and the terminal device. Optionally, in some implementations of the present disclosure, a CG may be equivalent to a network node or a network device, etc.

In the DC scenario, a protocol architecture of a transmission mode of duplicated data may be as shown in FIG. 1 and FIG. 2.

As shown in FIG. 1 and FIG. 2, in the DC scenario a protocol architecture of a split bearer is adopted for the transmission mode of duplicated data.

For uplink and downlink, a Packet Data Convergence Protocol (PDCP) is located in a certain CG (a Master CG (MCG) or a Secondary CG (SCG)), wherein the CG is an "anchor" CG.

The PDCP duplicates a PDCP Protocol Data Unit (PDU) into two same PDCP PDUs, for example, one is a PDCP PDU and the other is a duplicated PDCP PDU. The two PDCP PDUs go through Radio Link Control (RLC) layers and Media Access Control (MAC) layers of different CGs, reach a corresponding MAC layer and a corresponding RLC layer of a terminal (downlink) or a base station (uplink) through an air interface, and finally converge at a PDCP. When the PDCP layer detects that the two PDCP PDUs are of a same duplicated version, the PDCP layer discards one, and submits the other one to a higher layer.

In addition, in an implementation of the present disclosure, two bearers connecting the RLC and the MAC respectively under the PDCP are called split bearers. If the PDCP is located at an MCG, the split bear is an MCG Split Bearer. If the PDCP is located at an SCG, the split bear is an SCG Split Bearer.

In an implementation of the present disclosure, two PDCP PDUs are transmitted through different CGs, achieving a purpose of frequency diversity gain, thus improving reliability of data transmission.

It may be found that in the architectures shown in FIG. 2 to FIG. 4, data duplication transmission is performed based on a unique PDCP entity. However, in the above two protocol architectures, data duplication transmission is performed based on a unique PDCP entity. Therefore, when a user equipment (UE) moves from a first access network device to a second access network device, a security key needs to be changed, while a PDCP entity may only use one security key at one time. That is to say, in a network switching for data duplication transmission, the change of the security key causes the UE to perform an operation of a PDCP re-establishment to reconfigure the security key, which may cause an interruption of a service of the PDCP entity.

There is provided a network switching method in the present disclosure, avoiding the interruption of the service of the PDCP entity and further improving an efficiency of data transmission.

Figure 5:
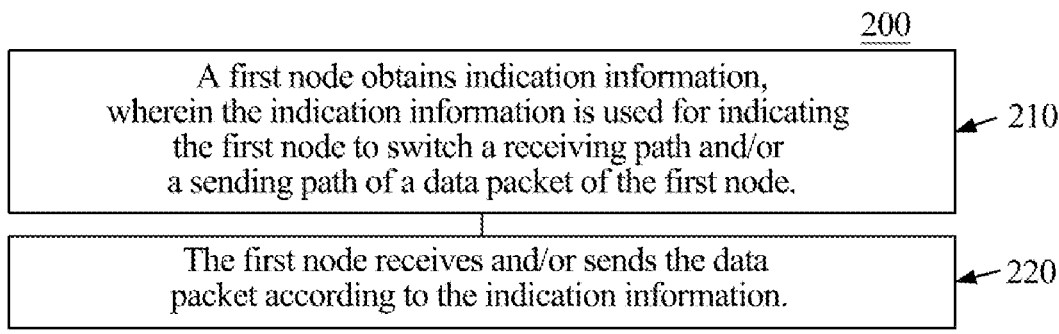
FIG. 5 is a schematic flow chart of a network switching method of an implementation of the present disclosure.

FIG. 5 shows a schematic flowchart of a network switching method 200 according to an implementation of the present disclosure, wherein the method 200 may be performed by a first node. The first node shown in FIG. 5 may be a terminal device 120 as shown in FIG. 1, an access network device 110 as shown in FIG. 1, or a core network device 130 as shown in FIG. 1. The method 200 includes a part or all of following contents.

In 210, the first node obtains indication information, wherein the indication information is used for indicating the first node to switch a receiving path and/or a sending path of a data packet of the first node.

In 220, the first node receives and/or sends the data packet according to the indication information.

Optionally, in some implementations of the present disclosure, the indication information is used for indicating the first node to switch from receiving the data packet from a fourth node to receiving the data packet from a second node. Therefore, the first node may directly receive the data packet from the second node according to the indication information.

In an implementation of the present disclosure, according to the indication information, the first node directly switches from the fourth node to the second node to receive the data packet, that is, directly switches an interface of the node, thereby realizing data transmission and reception.

Optionally, in some implementations of the present disclosure, the first node receives the indication information, so that the first node receives data packets from the second node according to the indication information.

Optionally, in some implementations of the present disclosure, the first node receives the indication information, so as to trigger the first node to start receiving data packets from the second node.

Optionally, in some implementations of the present disclosure, the first node or the second node or the fourth node includes at least one of the following:

a terminal device, an access network device, and a core network device.

Optionally, in some implementations of the present disclosure, an interface of the first node, the second node or the fourth node includes at least one of the following:

a Uu interface, an Xn interface, and an N3 interface.

Figure 6:
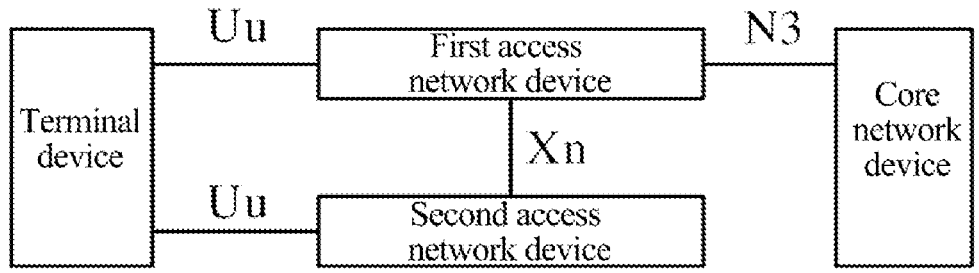
FIG. 6 is an example of a communication system for duplication transmission of an implementation of the present disclosure.
Figure 7:
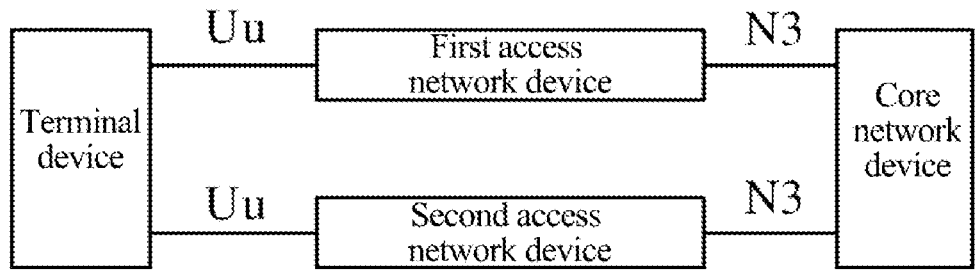
FIG. 7 is another example of a communication system for duplication transmission of an implementation of the present disclosure.

FIG. 6 is an example of a communication system for duplication transmission of an implementation of the present disclosure. FIG. 7 is a schematic block diagram of the communication system in FIG. 6 after a network switching is performed by using a network switching method of an implementation of the present disclosure. The network switching method of an implementation of the present disclosure will be described below with reference to FIG. 6.

In the communication system shown in FIG. 6, a first access network device is used for data duplication. A first access network device performs data transmission with a second access network device through an Xn interface or an X2 interface. The first access network device and the second access network device perform data transmission respectively with a terminal device UE through a Uu interface, and the first access network device performs data transmission with a core network device UPF through an N3 interface.

In other words, in the communication system shown in FIG. 6, duplication transmission of the Uu interface has been activated, and duplication transmission of the N3 interface has not been activated.

In the communication system shown in FIG. 7, the core network device or the terminal device is used for data duplication, the first access network device and the second access network device perform data transmission respectively with the terminal device UE through the Uu interface, and the first access network device and the second access network device perform data transmission respectively with core network device UPF through the N3 interface.

In other words, in the communication system shown in FIG. 6, the duplication transmission of the Uu interface has been activated, and the duplication transmission of the N3 interface has also been activated.

The network switching method of an implementation of the present disclosure is used for switching the communication system shown in FIG. 6 to the communication system shown in FIG. 7, enabling a switching procedure of the duplication transmission of the N3 interface from inactive to active.

Specifically, when the duplication transmission of the N3 interface is not activated, duplication transmission of data with the first access network device is implemented through the Xn interface or the X2 interface. After the duplication transmission of the N3 interface is activated, duplication transmission of data with the UPF may be implemented through the N3 interface.

Optionally, in some implementations of the present disclosure, the first node is the first access network device as shown in FIG. 6.

In this case, the fourth node may include the second access network device and the terminal device, and the second node may include the terminal device. That is to say, the indication information is used for indicating that the first access network device receives data packets from the second access network device and the terminal device, may be switched to receiving data packets from the terminal device.

In other words, the first access network device changes from following case A to case B.

Case A: the first access network device duplicates the data packet sent by the core network device, generates and sends the data packet to the terminal device and the second access network device.

Case B: the first access network device does not duplicate the data packet sent by the core network device, and sends the data packet only to the terminal device.

It should be understood that only the downlink data transmission and the change from case A to case B are taken as examples for illustrating the first access network device. For example, for uplink transmission, the first access network device may also switches from receiving the data packet from the terminal device and the second access device, performing redundancy detection on the received data packet, and then sending the data packet to the core network device to receiving the data packet from the terminal device and sending the data packet to the core network device.

Optionally, in some implementations of the present disclosure, the first node may be the second access network device as shown in FIG. 6.

In this case, the fourth node may be the first access network device, and the second node may be the core network device. That is, the indication information is used for indicating the second access network device to switch from receiving the data packet from the first access network device to receiving the data packet from the core network device.

In other words, the second access network device changes from following case C to case D.

Case C: the second access network device acquires the data packet from the first access network device and sends the data packet to the terminal device.

Case D: the second access network device acquires the data packet from the core network device, and sends the data packet to the terminal device.

Optionally, in some implementations of the present disclosure, for uplink transmission, that the second access network device receives data sent by terminal device and send the data to the first access network device, may be switched to receiving data packets from the terminal device and sending the data packets to the core network device.

In other words, in an implementation of the present disclosure, a receiving path of the data packet of the second access network device is switched to the core network device from the first access network device. A transmission path of the data packet of the second access network device may also be switched to the core network device from the first access network device.

Optionally, in some implementations of the present disclosure, the first node may also be the core network device as shown in FIG. 6.

In this case, the fourth node may be the first access network device, and the second node may be the first access network device and the second access network device. That is, the indication information is used for indicating the core network device to switch from receiving data packets from the first access network device to receiving data packets from the first access network device and the second access network device.

It should be understood that the above first node, second node and fourth node are only illustrative descriptions, and implementations of the present disclosure are not limited thereto.

In an implementation of the present disclosure, the first node also needs to determine a timing of network switching.

Optionally, in some implementations of the present disclosure, the indication information may be used as an end-marker (EM). After the first node receives the EM, it may be clear to switch to obtaining the data packet from the second node from obtaining the data packet from the fourth node.

For example, the indication information is used for indicating a last data packet received by the first node from the fourth node.

For another example, the indication information is used for indicating a sequence number of the last data packet received by the first node from the fourth node.

Optionally, in some implementations of the present disclosure, a General Packet Radio Service (GPRS) Tunneling Protocol data packet of a user plane is referred to as a GTP-U data packet for short. The GTP-U data packet may include the (SN number) number of the last data packet received by the first node from the fourth node.

Optionally, in some implementations of the present disclosure, the indication information may be used as a start marker. After the first node obtains the start marker, it may be clear to switch to obtaining the data packet from the second node from obtaining the data packet from the fourth node.

For example, the indication information is used for indicating a first data packet received by the first node from the second node.

For another example, the indication information is used for indicating a sequence number of the first data packet received by the first node from the second node.

In summary, in an implementation of the present disclosure, after the first node acquires the SN number of the last data packet obtained from the fourth node or the SN number of the first data packet obtained from the second node, it may be clear when to switch to obtaining the data packet from the second node from obtaining the data packet from the fourth node.

It should be understood that in an implementation of the present disclosure, the first node may obtain the data packet from the fourth node or the second node. It also may be negotiated and determined by the second node and the fourth node, or pre-configured, and this is not specifically restricted in implementations of the present disclosure.

It should also be understood, that the network switching method of an implementation of the present disclosure being used for switching the communication system shown in FIG. 6 to the communication system shown in FIG. 7 is only an example, and this is not restricted in implementations of the present disclosure.

Figure 8:
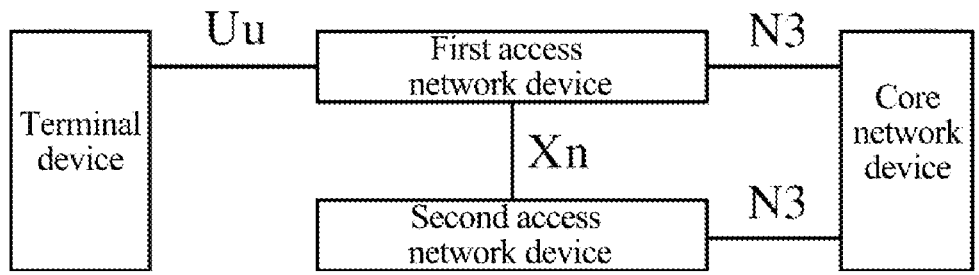
FIG. 8 is still another example of a communication system for duplication transmission of an implementation of the present disclosure.

For example, FIG. 8 is another example of a communication system for duplication transmission of an implementation of the present disclosure. The network switching method of an implementation of the present disclosure may also be used for switching the communication system described in FIG. 8 to the communication system shown in FIG. 7.

In the communication system shown in FIG. 8, a core network device is used for data duplication. A first access network device performs data transmission with a second access network device through an Xn interface or an X2 interface. The first access network device performs data transmission with a terminal device UE through a Uu interface, and the first access network device and the second access network device perform data transmission with the core network device UPF through an N3 interface.

In other words, in the communication system shown in FIG. 8, duplication transmission of the Uu interface is not activated, while duplication transmission of the N3 interface has been activated.

The network switching method in an implementation of the present disclosure is used for switching the communication system shown in FIG. 8 to the communication system shown in FIG. 7, enabling a switching procedure of the duplication transmission of the N3 interface from inactive to active. Therefore, it is ensured that a re-establishment operation of Packet Data Convergence Protocol (PDCP) entity may be avoided when a user equipment (UE) moves from the first access network device to the second access network device, thereby avoiding an interruption of the service of the PDCP entity and improving an efficiency of data transmission.

Specifically, when the duplication transmission of the Uu interface is not activated, duplication transmission of data may be implemented with the first access network device through the Xn interface, and after the duplication transmission of the Uu interface is activated, the duplication transmission of the data may be implemented with the terminal device through the Uu interface.

Optionally, in some implementations of the present disclosure, the first node is the first access network device as shown in FIG. 8.

In this case, the fourth node may include the second access network device and the core network device, and the second node may include the core network device. That is to say, indication information is used for indicating the first access network device to switch from receiving the data packet from the second access network device and the core network device to receiving a data packet from the core network device.

In other words, the first access network device changes from the following case E to case F.

Case E: the first access network device receives a data packet from the core network device and the second access network device, and sends the data packet on which a redundancy detection has been performed to the terminal device.

Case F: the first access network device only receives a data packet sent by the core network device and sending the data packet to the terminal device.

It should be understood that only the downlink data transmission and the change from case E to case F are taken as examples for illustrating the first access network device. For example, for uplink transmission, the first access network device may also switch to receiving the data packet from the terminal device and sending the data packet to the core network device from receiving the data sent by the terminal device and sending the data to the second access network device and the core network device.

Optionally, in some implementations of the present disclosure, the first node may be the terminal device as shown in FIG. 8.

In this case, the fourth node may be the first access network device, and the second node may be the first access network device and the second access network device. That is, the indication information is used for indicating the terminal device to switch from receiving the data packet from the first access network device to receiving the data packet from the first access network device and the second access network device.

It should be understood that above first node, second node and fourth node are only illustrative descriptions, but implementations of the present disclosure are not limited thereto.

Figure 9:
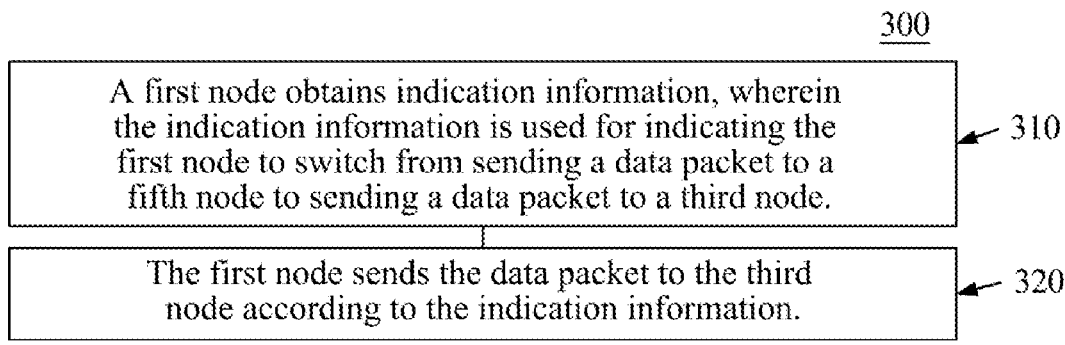
FIG. 9 is another schematic flow chart of a network switching method of an implementation of the present disclosure.

FIG. 9 is a schematic flow chart of a network switching method 300 of an implementation of the present disclosure. The method 300 may be carried out by a first node. The first node shown in FIG. 9 may be the terminal device 120 as shown in FIG. 1, the access network device 110 as shown in FIG. 1, and the core network device 130 as shown in FIG. 1. The method 300 includes a part or all of the following contents.

In 310, the first node obtains indication information, wherein the indication information is used for indicating the first node to switch from sending a data packet to a fifth node to sending a data packet to a third node.

In 320, the first node may send the data packet to the third node according to the indication information.

In an implementation of the present disclosure, the first node directly switches from the fifth node to the third node to receive the data packet according to the indication information, that is, the first node directly switches an interface of the node for sending and receiving data, thus a re-establishment operation of a Packet Data Convergence Protocol (PDCP) entity of the first node is avoided when the first node switches a sending network, thereby avoiding an interruption of a service of the PDCP entity and improving an efficiency of data transmission.

It should be understood that the method 300 shown in FIG. 9 and the method 300 shown in FIG. 5 may be used in combination or separately. This is not specifically restricted in implementations of the present disclosure.

Optionally, in some implementations of the present disclosure, the first node or the third node or the fifth node includes at least one of the following:

a terminal equipment, an access network device, and a core network device.

Optionally, in some implementations of the present disclosure, an interface of the first node between the third node or the fifth node includes at least one of following:

a Uu interface, an Xn interface and an N3 interface.

Optionally, in some implementations of the present disclosure, the indication information is used for indicating a last data packet sent by the first node to the fifth node.

Optionally, in some implementations of the present disclosure, the indication information is used for indicating a sequence number of the last data packet sent by the first node to the fifth node.

Optionally, in some implementations of the present disclosure, the indication information is used for indicating a first data packet sent by the first node to the third node.

Optionally, in some implementations of the present disclosure, the indication information is used for indicating a sequence number of the first data packet sent by the first node to the third node.

It should be understood that acts in the method 300 for switching the sending network by the first node as shown in FIG. 9 may refer to corresponding acts in the method 200 for switching the receiving network by the first node as shown in FIG. 5, and this will not be repeated here for brevity.

In the implementation, considering that duplicate transmission of N3/Xn and Uu is independent of each other, when the first node sends the data packet to the third node, SN numbers of data sent on the Uu and the N3/Xn further need to be determined.

Optionally, in some implementations of the present disclosure, the indication information is also used for indicating a corresponding relationship between a first sequence number and a second sequence number, wherein the first sequence number includes a sequence number of a data packet of an interface between the first node and a second node, and the second sequence number includes a sequence number of a data packet of an interface between the first node and the third node. Therefore, the first node generates and sends the data packet to the third node according to the indication information.

For example, the first node is the second access network device shown in FIG. 6, when a communication system of the first node is switched to the communication system shown in FIG. 7, after the second access network device receives the data packet sent by the terminal device, the second access network device needs to send the data packet to the core network device through the N3 interface.

Further, for example, the second access device performs the uplink transmission. The second access network device changes from configuring an SN number of data of the X2 interface according to a PDCP SN number sent from the terminal device initially to configuring an SN number of data of the N3 interface according to the PDCP SN number sent from terminal device. In an implementation of the present disclosure, the second access network device may correctly configure an SN number of a data packet sent to the core network device by obtaining the corresponding relationship between the SN number of the data of the N3 interface and the PDCP SN number.

For example, the second access network device may generate a data packet sent to the core network device by obtaining a corresponding relationship between an SN number of a data packet of X2 interface data which should be allocated firstly and an SN number of the data of the N3 interface obtained from the terminal device.

Further, for example, the second access network device performs the downlink transmission. The second access network device changes from configuring a PDCP SN number according to an SN number of data of an Xn interface initially to configuring a PDCP SN number according to an SN number of data of the N3 interface. In an implementation of the present disclosure, the second access network device may correctly configure the SN number of the data packet sent to the terminal device by obtaining a corresponding relationship between an SN number of the data of the N3 interface and an SN number of the data of the Uu interface.

For example, the second access network device may generate the PDCP SN number of the data packet sent to the terminal device by obtaining the corresponding relationship between an SN number of a data packet of an N3 interface which should be allocated firstly and an SN number of a data packet of the Uu interface obtained from the core network device.

Method implementations of the present disclosure are described in detail above in combination with FIG. 1 to FIG. 9. Device implementations of the present disclosure are described in detail below in combination with FIG. 10 to FIG. 11.

Figure 10:
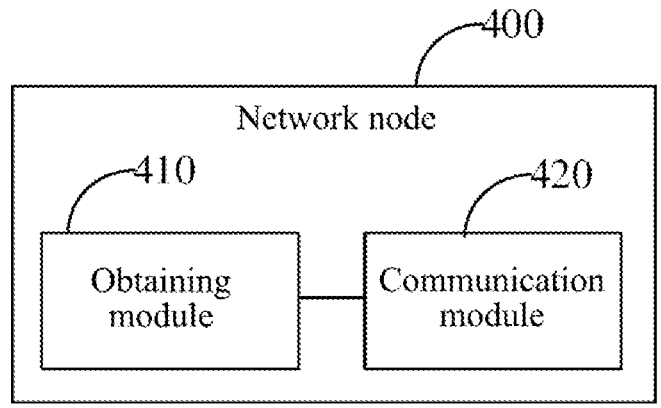
FIG. 10 is a schematic block diagram of a network node of an implementation of the present disclosure.

FIG. 10 is a schematic block diagram of a network node of an implementation of the present disclosure.

Specifically, as shown in FIG. 10, the network node 400 may include: an obtaining module 410 and a communication module 420.

The obtaining module 410 is configured to obtain indication information, wherein the indication information is used for indicating the network node to switch a receiving path and/or a sending path of a data packet of the network node.

The communication module 420 is configured to receive and/or send the data packet according to the indication information.

Optionally, in some implementations of the present disclosure, the indication information is used for indicating the network node to switch from receiving the data packet from a fourth node to receiving the data packet from a second node.

The communication module 420 is specifically configured to: receive the data packet from the second node according to the indication information.

Optionally, in some implementations of the present disclosure, the indication information is used for indicating a last data packet received by the network node from the fourth node.

Optionally, in some implementations of the present disclosure, the indication information is used for indicating a sequence number of the last data packet received by the network node from the fourth node.

Optionally, in some implementations of the present disclosure, the indication information is used for indicating a first data packet received by the network node from the second node.

Optionally, in some implementations of the present disclosure, the indication information is used for indicating a sequence number of the first data packet received by the network node from the second node.

Optionally, in some implementations of the present disclosure, the indication information is used for indicating the network node to switch from sending the data packet to a fifth node to sending the data packet to a third node.

The communication module 420 is specifically configured to: send a data packet to the third node according to the indication information.

Optionally, in some implementations of the present disclosure, the indication information is used for indicating a last data packet sent by the network node to a fifth node.

Optionally, in some implementations of the present disclosure, the indication information is used for indicating a sequence number of the last data packet sent by the network node to the fifth node.

Optionally, in some implementations of the present disclosure, the indication information is used for indicating a first data packet sent by the network node to the third node.

Optionally, in some implementations of the present disclosure, the indication information is used for indicating a sequence number of the first data packet sent by the network node to the third node.

Optionally, in some implementations of the present disclosure, the indication information is also used for indicating a corresponding relationship between a first sequence number and a second sequence number, wherein the first sequence number includes a sequence number of a data packet of an interface between the network node and a second node, and the second sequence number includes a sequence number of a data packet of an interface between the network node and a third node.

Optionally, in some implementations of the present disclosure, the second node is a node after the network node switches the receiving path.

Optionally, in some implementations of the present disclosure, the third node is a node after the network node switches the sending path.

Optionally, in some implementations of the present disclosure, the communication module is specifically configured to:
generate and send the data packet to the third node according to the indication information.

Optionally, in some implementations of the present disclosure, the network node or the second node or the third node comprises at least one of the following:
a terminal equipment, an access network device, and a core network device.

Optionally, in some implementations of the present disclosure, an interface of the network node or the second node or the third node includes at least one of the following:
a Uu interface, an Xn interface, and an N3 interface.

It should be understood that the device implementations and the method implementations may correspond to each other, and similar description may be referred to the method implementations. Specifically, the network node 400 shown in FIG. 10 may correspond to a corresponding subject that performs the method 200 of an implementation of the present disclosure, and above and other operations and/or functions of various units in the network node 400 are respectively for implementing corresponding flows in various methods shown in FIG. 5, and this will not be repeated here for the sake of conciseness.

The network node of an implementation of the present disclosure is described from a perspective of a functional module with reference to FIG. 10. It should be understood that this functional module may be implemented by hardware, instructions in a form of software, or a combination of hardware and software modules.

Specifically, various acts of method implementations in implementations of the present disclosure may be completed by integrated logic circuits in hardware and/or instructions in a form of software in a processor, and acts of the method disclosed in combination with implementations of the present disclosure may be directly embodied as being executed by a hardware decoding processor, or by a combination of hardware and software modules in the decoding processor. Optionally, the software modules may be located in a storage medium commonly used in the art, such as a random access memory, a flash memory, a read-only memory, a programmable read-only memory, an electrically erasable programmable memory, or a register. The storage medium is located in a memory, and the processor reads information in the memory and completes acts of the above method implementations in combination with its hardware.

For example, in an implementation of the present disclosure, the obtaining module 410 shown in FIG. 10 may be implemented by the processor, and the communication module 420 shown in FIG. 10 may be implemented by a transceiver.

Figure 11:
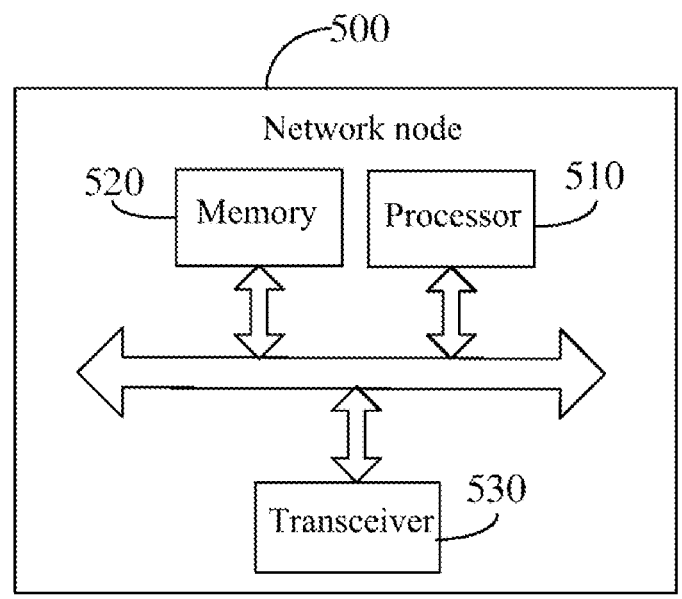
FIG. 11 is another schematic block diagram of a network node of an implementation of the present disclosure.

FIG. 11 is a schematic structural diagram of a network node 500 of an implementation of the present disclosure. The network node 500 shown in FIG. 11 includes a processor 510. The processor 510 may call and run a computer program from a memory to implement the method in an implementation of the present disclosure.

Optionally, as shown in FIG. 11, the network node 500 may further include a memory 520. The memory 520 may be configured to store indication information, and also may be configured to store codes, instructions, etc., executed by the processor 510. The processor 510 may call and run the computer program from the memory 520 to implement the method in an implementation of the present disclosure.

The memory 520 may be a separate device independent of the processor 510 or may be integrated in the processor 510.

Optionally, as shown in FIG. 11, the network node 500 may further include a transceiver 530, and the processor 510 may control the transceiver 530 to communicate with other devices, specifically, may send information or data to other devices or receive information or data sent by other devices.

The transceiver 530 may include a transmitter and a receiver. The transceiver 530 may further include antennas, and the number of antennas may be one or more.

Optionally, the network node 500 may be a first node in an implementation of the present disclosure, and the network node 500 may implement corresponding procedures implemented by the first node in each method of an implementation of the present disclosure. That is to say, the network node 500 in an implementation of the present disclosure may correspond to the network node 400 in an implementation of the present disclosure, and may correspond to corresponding subjects executing the methods 200 and 300 according to an implementation of the present disclosure, and this will not be described here for brevity.

It should be understood that various components in the network device 500 are connected by a bus system. The bus system includes a power bus, a control bus and a status signal bus in addition to a data bus.

In addition, there is also provided a chip in an implementation of the present disclosure. The chip may be an integrated circuit chip with a signal processing capability, and may implement or execute various methods, acts and logic block diagrams disclosed in implementations of the present disclosure.

Optionally, the chip may be applied to various network nodes, enabling a network node on which the chip is installed to execute various methods, acts and logic block diagram the disclosed in implementations of the present disclosure.

Figure 12:
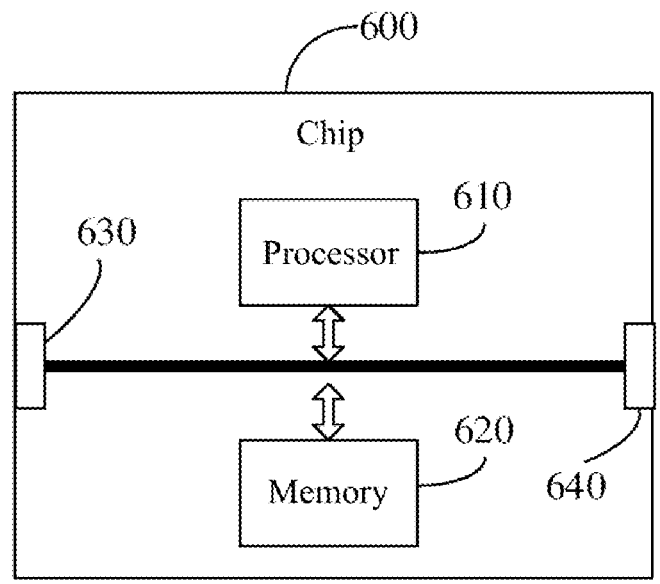
FIG. 12 is a schematic block diagram of a chip of an implementation of the present disclosure.

FIG. 12 is a schematic structural diagram of a chip according to an implementation of the present disclosure.

A chip 600 shown in FIG. 12 includes a processor 610. The processor 610 may call and run a computer program from a memory to implement the method in an implementation of the present disclosure.

Optionally, as shown in FIG. 12, the chip 600 may also include a memory 620. The processor 610 may call and run a computer program from the memory 620 to implement the method in an implementation of the present disclosure. The memory 620 may be configured to store indication information, also may be configured to store codes, instructions, etc., executed by the processor 610.

The memory 620 may be a separate device independent of the processor 610 or may be integrated in the processor 610.

Optionally, the chip 600 may also include an input interface 630. The processor 610 may control the input interface 630 to communicate with other devices or chips, specifically, may obtain information or data sent by other devices or chips.

Optionally, the chip 600 may further include an output interface 640. The processor 610 may control the output interface 640 to communicate with other devices or chips, specifically, may output information or data to other devices or chips.

Optionally, the chip may be applied in a network device of an implementation of the present disclosure, and the chip may implement corresponding procedures implemented by the network device in various methods of implementations of the present disclosure, and this will not be repeated here for brevity.

Optionally, the chip may be applied in a terminal device of an implementation of the present disclosure, and the chip may implement corresponding procedures implemented by the terminal device in various methods of implementations of the present disclosure, and this will not be repeated here for brevity.

It should be understood that the chip mentioned in an implementation of the present disclosure may be referred to as a system-level chip, a system chip, a chip system or a system-on-chip, etc. It should be also understood that various components in the device 600 are connected through a bus system. In addition to a data bus, the bus system further includes a power bus, a control bus, and a status signal bus, etc.

The processor mentioned in an implementation of the present disclosure may be a general purpose processor, a digital signal processor (DSP), an application specific integrated circuit (ASIC), a field programmable gate array (FPGA) or other programmable logic devices, a transistor logic device, or a discrete hardware component, etc. Furthermore, the general purpose processor may be a microprocessor or the processor may be any conventional processor etc.

The memory mentioned in an implementation of the present disclosure may be a volatile memory or non-volatile memory, or may include both the volatile and the non-volatile memory. The non-volatile memory may be a read-only memory (ROM), a programmable ROM (PROM), an erasable PROM (EPROM), an electrically erasable EPROM (EEPROM), or a flash memory. The volatile memory may be a Random Access Memory (RAM) which serves as an external cache.

It should be understood that, the foregoing memory is illustrative but not restrictive description. For example, optionally, the memory in an implementation of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM), a Direct Rambus RAM (DR RAM), etc.

There is also provided a computer readable storage medium in an implementation of the present disclosure, configured to store a computer program.

Optionally, the computer readable storage medium may be applied in a network device of an implementation of the present disclosure, and the computer program enables the computer to execute corresponding procedures implemented by the network device in various methods of implementations of the present disclosure, and this will not be repeated here for brevity.

Optionally, the computer readable storage medium may be applied in a mobile terminal/terminal device of an implementation of the present disclosure, and the computer program enables the computer to execute corresponding procedures implemented by the mobile terminal/terminal device in various methods of implementations of the present disclosure, and this will not be repeated here for brevity.

There is also provided a computer program product in an implementation of the present disclosure, including computer program instructions.

Optionally, the computer program product may be applied in a network device of an implementation of the present disclosure, and the computer program instructions enable the computer to execute corresponding procedures implemented by the network device in various methods of implementations of the present disclosure, and this will not be repeated here for brevity.

Optionally, the computer program product may be applied in a mobile terminal/terminal device of an implementation of the present disclosure, and the computer program instructions enable the computer to execute corresponding procedures implemented by the mobile terminal/terminal device in various methods of implementations of the present disclosure, and this will not be repeated here for brevity.

There is also provided a computer program in an implementation of the present disclosure.

Optionally, the computer program may be applied in a network device of an implementation of the present disclosure. When the computer program is run on the computer, the computer is enabled to execute corresponding procedures implemented by the network device in various methods of implementations of the present disclosure, and this will not be repeated here for brevity.

There is also provided a communication system in an implementation of the present disclosure. The communication system may include a first node. The first node is configured to obtain indication information, wherein the indication information is used for indicating the first node to switch a receiving path and/or sending path of a data packet of the network node; and receive and/or send the data packet according to the indication information.

Optionally, in some implementations of the present disclosure, the communication system further includes a second node and a fourth node, and the indication information is used for indicating the first node to switch from receiving the data packet from the fourth node to receiving the data packet from the second node.

Optionally, in some implementations of the present disclosure, the communication system further includes a third node and a fourth node, and the indication information is used for indicating the first node to switch from sending the data packet to the fifth node to sending the data packet to the third node.

It should be understood that corresponding functions of the first node, the second node, the third node, the fourth node, and the fifth node may refer to specific flows in the above method implementations, and this will not be repeated here for brevity.

It should be noted that a term "system" etc. herein may also be called a "network management architecture" or a "network system" etc.

It should be also understood that the terms used in implementations of the present disclosure and appended claims are only for a purpose of describing specific implementations, but are not intended to limit implementations of the present disclosure.

For example, the singular forms "a", "said", "aforementioned" and "the" used in implementations of the present disclosure and the appended claims are also intended to include plural forms unless other meanings are clearly indicated in the context.

Those of ordinary skill in the art will recognize that exemplary elements and algorithm acts described in combination with implementations disclosed herein may be implemented in electronic hardware, or a combination of computer software and electronic hardware. Whether these functions are implemented in hardware or software depends on a specific application and design constraints of a technical solution. Those skilled in the art may use different methods to implement described functions for each particular application, but such implementation should not be considered to be beyond a scope of implementations of the present disclosure.

The function units may be stored in a computer readable storage medium if implemented in a form of software functional units and sold or used as a separate product. Based on this understanding, a technical solution of implementations of the present disclosure, in essence, or a part contributing to the existing art, or a part of the technical solution, may be embodied in a form of a software product stored in a storage medium, including several instructions for enabling a computer device (which may be a personal computer, a server, or a network device, etc.) to execute all or a part of acts of the methods described in implementations of the present disclosure. The aforementioned storage medium includes various media capable of storing program codes, such as, a U disk, a mobile hard disk, a read-only memory (ROM), a magnetic disk, or an optical disk.

Those skilled in the art may clearly understand that for convenience and conciseness of description, specific working processes of the systems, devices and units described above may refer to corresponding processes in aforementioned method implementations and will not be described here.

In several implementations provided by the present disclosure, it should be understood that disclosed systems, devices and methods may be implemented in other ways.

For example, a division of the units or modules or components in the device implementation described above is only a logical function division, and there may be other division manners in actual implementation. For example, multiple units or modules or components may be combined or integrated into another system, or some units or modules or components may be ignored or not executed.

For another example, the above unit/module/component described as a separate/displayed component may or may not be physically separated, that is, it may be located in one place or may be distributed over multiple network units. Some or all of the units may be selected according to practical needs to achieve a purpose of implementations of the present disclosure.

Finally, it should be noted that, a mutual coupling or direct coupling or communication connection shown or discussed above may be an indirect coupling or communication connection between apparatus or units through some interfaces, and may be in electrical, mechanical or other forms.

The foregoing is merely exemplary implementations of the present disclosure, but the protection scope of implementations of the present disclosure is not limited thereto. Any person skilled in the art may easily conceive variations or substitutions within a technical scope disclosed by implementations of the present disclosure, which should be included within a protection scope of implementations of the present disclosure. Therefore, the protection scope of implementations of the present disclosure should be decided by the protection scope of the claims.

What is claimed is:

1. A wireless communication method, comprising:
    obtaining, by a first node, indication information, wherein the indication information is used for indicating the first node to switch from receiving a data packet from a fourth node to receiving a data packet from a second node and for indicating the first node to switch from sending a data packet to a fifth node to sending a data packet to a third node;
    receiving, by the first node, a data packet from the second node according to the indication information; and
    sending, by the first node, a data packet to the third node according to the indication information, wherein the indication information is used for indicating a last data packet received by the first node from the fourth node and a last data packet sent by the first node to the fifth node or for indicating a first data packet received by the first node from the second node and a first data packet sent by the first node to the third node.

2. A non-transitory storage medium, wherein the non-transitory storage medium is configured to store a computer program, wherein the computer program comprises instructions for executing the method of claim 1.

3. The method of claim 1, wherein the indication information is used for indicating a sequence number of the last data packet received by the first node from the fourth node.

4. The method of claim 1, wherein the indication information is used for indicating a sequence number of the first data packet received by the first node from the second node.

5. The method of claim 1, wherein the indication information is used for indicating a sequence number of the last data packet sent by the first node to the fifth node.

6. The method of claim 1, wherein the indication information is used for indicating a sequence number of the first data packet sent by the first node to the third node.

7. The method of claim 1, wherein the indication information is further used for indicating a corresponding relationship between a first sequence number and a second sequence number, wherein the first sequence number comprises a sequence number of a data packet of an interface between the first node and the second node, and the second sequence number comprises a sequence number of a data packet of an interface between the first node and the third node.

8. The method of claim 7, wherein sending, by the first node, the data packet to the third node according to the indication information, comprises:
    generating and sending, by the first node, the data packet to the third node according to the indication information.

9. The method of claim 1, wherein the first node or the second node or the third node comprises at least one of a terminal device, an access network device, or a core network device.

10. The method of claim 1, wherein an interface of the first node or the second node or the third node comprises at least one of a Uu interface, an Xn interface, or an N3 interface.

11. A network node, comprising: a processor and a transceiver, wherein
    the processor is configured to obtain indication information, wherein the indication information is used for indicating the network node to switch from receiving a data packet from a fourth node to receiving a data packet from a second node and for indicating the network node to switch from sending a data packet to a fifth node to sending a data packet to a third node; and
    the transceiver is configured to receive a data packet from the second node according to the indication information and to send a data packet to the third node according to the indication information,
    wherein the indication information is used for indicating a last data packet received by the network node from the fourth node and a last data packet sent by the network node to the fifth node or for indicating a first data packet received by the network node from the second node and a first data packet sent by the network node to the third node, and
    wherein the network node is a first node.

12. The network node of claim 11, wherein the indication information is used for indicating a sequence number of the last data packet received by the network node from the fourth node.

13. The network node of claim 11, wherein the indication information is used for indicating a sequence number of the first data packet received by the network node from the second node.

14. The network node of claim 11, wherein the indication information is used for indicating a sequence number of the last data packet sent by the network node to the fifth node.

15. The network node of claim 11, wherein the indication information is used for indicating a sequence number of the first data packet sent by the network node to the third node.

16. The network node of claim 11, wherein the indication information is further used for indicating a corresponding relationship between a first sequence number and a second sequence number, wherein the first sequence number comprises a sequence number of a data packet of an interface between the network node and the second node, and the second sequence number comprises a sequence number of a data packet of an interface between the network node and the third node.

17. The network node of claim 16, wherein the processor is further configured to generate a data packet to be sent to the third node according to the indication information; and
   the transceiver is further configured to send the generated data packet to the third node according to the indication information.

18. The network node of claim 11, wherein the network node or the second node or the third node comprises at least one of following:
   a terminal device, an access network device, and a core network device.

19. The network node of claim 11, wherein an interface of the network node or the second node or the third node comprises at least one of following:
   a Uu interface, an Xn interface, and an N3 interface.

* * * * *